Dec. 22, 1931.  A. R. LEUKHARDT  1,837,453

PNEUMATIC BUZZER

Filed Oct. 10, 1930

INVENTOR.
ARTHUR R. LEUKHARDT
BY
Wm. M. Cady
ATTORNEY.

Patented Dec. 22, 1931

1,837,453

UNITED STATES PATENT OFFICE

ARTHUR R. LEUKHARDT, OF DETROIT, MICHIGAN, ASSIGNOR TO THE WESTINGHOUSE AIR BRAKE COMPANY, OF WILMERDING, PENNSYLVANIA, A CORPORATION OF PENNSYLVANIA

PNEUMATIC BUZZER

Application filed October 10, 1930. Serial No. 487,743.

This invention relates to audible signal devices and more particularly to signal devices of the type adapted to be used on vehicles for the purpose of signalling the operators.

An object of the invention is to provide an improved signal device in which fluid under pressure is utilized for operating the sound producing elements.

Another object of the invention is to provide a signal device of the above type in which the sound producing elements are operated by fluid under pressure so as to produce buzzing sounds.

Another object of the invention is to provide an improved signal device of the above character, which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
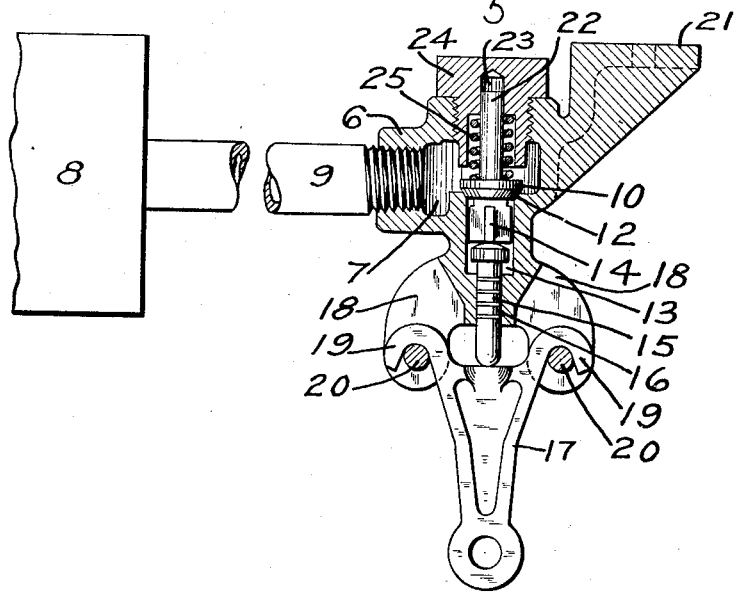
Figure 2:
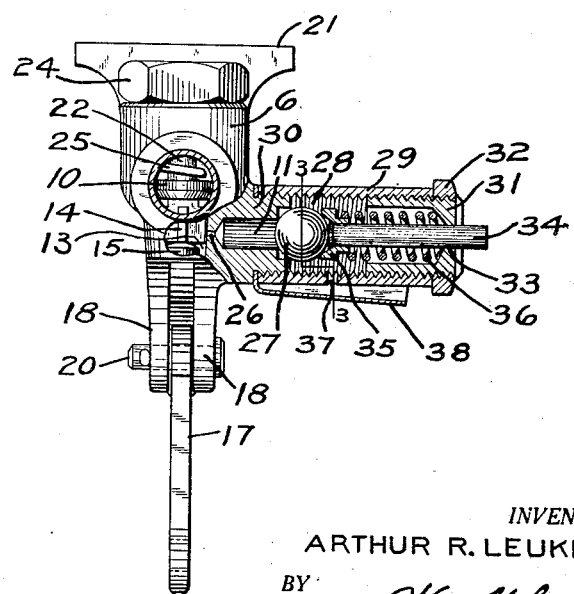
Figure 3:
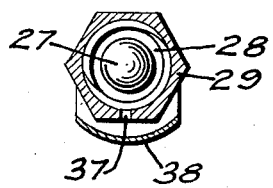

In the accompanying drawings; Figure 1 is a vertical section of a sound producing device embodying the invention; Fig. 2 is an elevation, partly in section, looking at the device in a direction at right angles to Fig. 1; and Fig. 3 is a vertical transverse section taken on the line 3—3 of Fig. 2.

Referring to the drawings, the device may comprise a casing 6, provided with a chamber 7 which is connected to a supply of fluid under pressure, such as a reservoir 8, through a pipe 9. The reservoir 8 may be supplied with fluid under pressure from a suitable source (not shown).

Mounted within the chamber 7 is a valve 10 adapted to control communication from chamber 7 to a second chamber 11, also formed in the casing. The valve 10 is adapted to engage a seat 12 provided between chamber 7 and a cavity 13 formed in the bottom of the casing.

On its lower side, the control valve 10 is provided with a fluted stem 14 which extends downwardly into the cavity 13, and is engaged by the head of a plunger 15, mounted in a bore 16 formed in the bottom of the casing.

The plunger 15 projects below the bottom of the casing 6 a suitable distance, and is engaged by an operating lever 17.

The lever 17 is swingingly mounted between spaced pairs of ears 18, which project laterally from the casing. The lever 17 is provided with oppositely extending arms 19 which terminate in hooks that engage pins 20 passed through each pair of ears 18, the construction being such that the lever can be tilted in two directions for the purpose of raising the plunger 15 for the purpose to be hereinafter described.

Projecting upwardly from the control valve 10 is a stem 22 which terminates in a recess 23 formed in a cap nut 24 screwed into the casing.

Encircling the stem 22 and bearing at one end against the valve 10 and at the other end against the cap nut 24, is an expansible coil spring 25, which urges said valve towards the seat 12.

The casing 6 is provided with a flange 21 which is disposed in a plane above the cap nut 24 so that the device can be secured in position.

At one end, the chamber 11 is connected to the cavity 15, by a restricted port 26, and at the opposite end the chamber 11 is normally closed by a ball valve 27, mounted in a chamber 28 of larger diameter than the chamber 11.

As shown, the chamber 28 may be formed in a tubular internally threaded member 29 which at one end is screwed onto a laterally extending portion 30 of the casing, the outer end of the member 29 being closed by a cap 31. The cap 31 is externally threaded for engaging the internal threads of the member 29, and a lock nut 32 is provided for locking the cap 31 in its adjusted position in the member.

The end of the cap 31 is formed with an opening 33, through which projects the end of a pin 34 mounted in the chamber 28. Bearing against the ball valve 27 and also against the inner headed end of the pin 34, is a collar 35. Interposed between the collar 35 and the end of the cap 31 and surrounding the pin 34, is an expansible coil spring 36, which tends to maintain the ball valve 27 seated. The pressure of the spring 36 against the ball valve 27 can be adjusted by screwing the cap 31 inwardly or outwardly of the member 29, as will be readily understood.

The chamber 28 is connected to the atmosphere, through a vent port 37, formed in the wall of the tubular member 29.

Disposed beneath the vent port 37, is a baffle or sound shield 38. As shown, the sound shield 38 is preferably in the form of an arcuate plate, having one end and its sides free, and its opposite end secured between the abutting portions of the tubular member 29 and the casing.

In operation, when it is desired to produce a signal, the lever 17 is operated in either direction so as to lift the plunger 15. This action causes the control valve 10 to be unseated, thereby permitting fluid under pressure to flow from chamber 7, through cavity 13 and restricted port 26, to chamber 11.

When the pressure of the fluid thus admitted to chamber 11 builds up sufficiently to overcome the opposing pressure of spring 36, the ball 27 will be unseated, and the fluid under pressure in chamber 11 will expand in chamber 28 and pass to the atmosphere through the vent port 37.

When the ball 27 opens the connection between chambers 11 and 28, there is a sudden drop in the pressure of the fluid in chamber 11, since the admission of fluid under pressure to the chamber 11 from chamber 7 is restricted by port 26, and the spring 36 will immediately force the ball 27 to its seat, thereby closing the opening between chambers 11 and 28. This operation will continue as long as the control valve 10 is held unseated and pressure high enough to unseat the ball 27 is maintained.

The repeated opening and closing of the ball valve produces vibrations which are carried outwardly through the vent port 37 and impinge on the sound shield 38, thereby producing a sound simulating very closely the sound produced by an electrically operated buzzer.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A sound producer comprising a chamber, means for supplying fluid under pressure to said chamber, a second chamber, open to the atmosphere, a ball valve controlling communication between the chambers and subject to the fluid pressure in said first mentioned chamber tending to unseat the valve, and a spring tending to maintain the ball valve seated.

2. A sound producer comprising a chamber adapted to be supplied with fluid under pressure, a second chamber, open to the atmosphere, a ball controlling communication between the chambers and subject to the fluid pressure in said first mentioned chamber tending to unseat the valve, and resilient means opposing the movement of the ball in the direction in which communication is established between the chambers.

3. A sound producer comprising a chamber, means for supplying fluid under pressure at a restricted rate to said chamber, a second chamber, open to the atmosphere and connected to the first chamber, and a ball subject to the opposing pressures of a spring and the fluid in the first chamber, for controlling communication between the chambers.

4. A sound producer comprising a chamber, means for supplying fluid under pressure at a restricted rate to said chamber, an expansion chamber, connected to said first chamber, valve means subject to the opposing pressures of the fluid in the first chamber and a spring in the second chamber, for controlling communication between the chambers, an atmospheric vent port leading from the second chamber, and a sound shield disposed in the path of fluid passing through the vent port.

5. A sound producer comprising a source of fluid under pressure, a chamber, means for supplying fluid under pressure at a restricted rate to said chamber, a second chamber, a vent port connecting the second chamber with the atmosphere, a valve controlling communication between the chambers, and means tending to maintain the valve seated against the pressure of the fluid in the first chamber.

6. A sound producer comprising a casing provided with a plurality of connected chambers, means for supplying fluid under pressure at a restricted rate to one of the chambers, and a spring pressed ball controlling communication between the chambers and adapted to be unseated when the fluid pressure exceeds the spring pressure.

7. A sound producer comprising a casing provided with a chamber, means for supplying fluid under pressure at a restricted rate to said chamber, a second chamber, connected to the atmosphere, a ball controlling communication between the chambers, and means opposing the pressure of the fluid in the first chamber for maintaining the ball seated, said means being adapted to permit the ball to unseat when the fluid pressure builds up a predetermined amount.

8. A sound producer comprising a casing provided with a pair of chambers, a ball valve for controlling communication between the chambers, means for admitting fluid under pressure to one chamber at a restricted rate, a port for venting fluid from the other chamber at a greater rate than the fluid is admitted to the first named chamber, a spring pressing against the ball and opposing the pressure of the fluid admitted to the first named chamber, and a sound shield disposed in the path of the fluid passing through the vent port.

In testimony whereof I have hereunto set my hand, this 3rd day of October, 1930.

ARTHUR R. LEUKHARDT.